(12) United States Patent
Dietz et al.

(10) Patent No.: US 8,957,867 B2
(45) Date of Patent: Feb. 17, 2015

(54) HAPTIC OPERATING DEVICE

(75) Inventors: Armin Dietz, Regensburg (DE); Werner Lange, Frankfurt (DE); Heinz Pofahl, Gera (DE); Bruno Santarossa, Limeshain (DE); Josef Werner, Leinburg (DE); Klaus Wittwer, Eppstein (DE)

(73) Assignee: Continental Automotive GmbH, Hannover (DE)

( * ) Notice: Subject to any disclaimer, the term of this patent is extended or adjusted under 35 U.S.C. 154(b) by 492 days.

(21) Appl. No.: 13/130,177

(22) PCT Filed: Nov. 10, 2009

(86) PCT No.: PCT/EP2009/064871
§ 371 (c)(1),
(2), (4) Date: Aug. 15, 2011

(87) PCT Pub. No.: WO2010/057806
PCT Pub. Date: May 27, 2010

(65) Prior Publication Data
US 2011/0291975 A1 Dec. 1, 2011

(30) Foreign Application Priority Data
Nov. 21, 2008 (DE) .......................... 10 2008 058 568

(51) Int. Cl.
*G06F 3/041* (2006.01)
*G06F 3/01* (2006.01)
*B60K 37/06* (2006.01)
*G06F 1/18* (2006.01)
(Continued)

(52) U.S. Cl.
CPC ............... *G06F 3/016* (2013.01); *B60K 37/06* (2013.01); *G06F 1/182* (2013.01); *G06F 3/03547* (2013.01); *G06F 3/041* (2013.01); *H01H 2003/008* (2013.01)
USPC ........... 345/173; 361/600; 361/606; 361/748; 361/679.55; 361/679.01; 345/174; 345/175; 345/176

(58) Field of Classification Search
USPC .................................................. 345/173, 156
See application file for complete search history.

(56) References Cited

U.S. PATENT DOCUMENTS

| 5,702,779 | A * | 12/1997 | Siebelink et al. | ............... 428/14 |
| 7,334,241 | B2 | 2/2008 | Bierhoff | |
| 2003/0222858 | A1 * | 12/2003 | Kobayashi | ................... 345/173 |

(Continued)

FOREIGN PATENT DOCUMENTS

| CN | 1973521 A | 5/2007 |
| DE | 201 02 197 U1 | 6/2001 |

(Continued)

*Primary Examiner* — Grant Sitta
(74) *Attorney, Agent, or Firm* — Cozen O'Connor

(57) ABSTRACT

A haptic operating device particularly for motor vehicles, having a touch panel having at least one touch-sensitive area. When the area is touched, a switching signal can be triggered and the touch panel can be activated by a motion drive to be able to move at a certain rhythm in the plane of the touch panel. The touch panel is connected to a fixed support by one or more flexible connecting elements. The support and the touch panel form two housing parts of a closed housing, in which at least the display device or the display plane thereof is arranged, and are connected to each other by a sealing device so as to be able to move relative to each other in the plane of the touch panel or in a plane parallel to the touch panel.

20 Claims, 2 Drawing Sheets

(51) Int. Cl.
*G06F 3/0354* (2013.01)
*H01H 3/00* (2006.01)

(56) References Cited

U.S. PATENT DOCUMENTS

| | | | |
|---|---|---|---|
| 2005/0003869 A1 | 1/2005 | Kaikuranta | |
| 2005/0225539 A1 | 10/2005 | Prados | |
| 2006/0022952 A1 | 2/2006 | Ryynanen | |
| 2006/0146037 A1* | 7/2006 | Prados et al. | 345/173 |
| 2007/0146343 A1* | 6/2007 | Prados | 345/173 |
| 2009/0051662 A1* | 2/2009 | Klein et al. | 345/173 |
| 2009/0174672 A1* | 7/2009 | Schmidt | 345/173 |

FOREIGN PATENT DOCUMENTS

| | | |
|---|---|---|
| DE | 102 28 821 A1 | 7/2003 |
| DE | 10 2006 047 893 A1 | 6/2007 |
| EP | 1 560 102 A2 | 8/2005 |
| JP | 2007034954 A | 2/2007 |
| WO | WO 02/073587 A1 | 9/2002 |
| WO | WO 2004/100167 A1 | 11/2004 |

\* cited by examiner

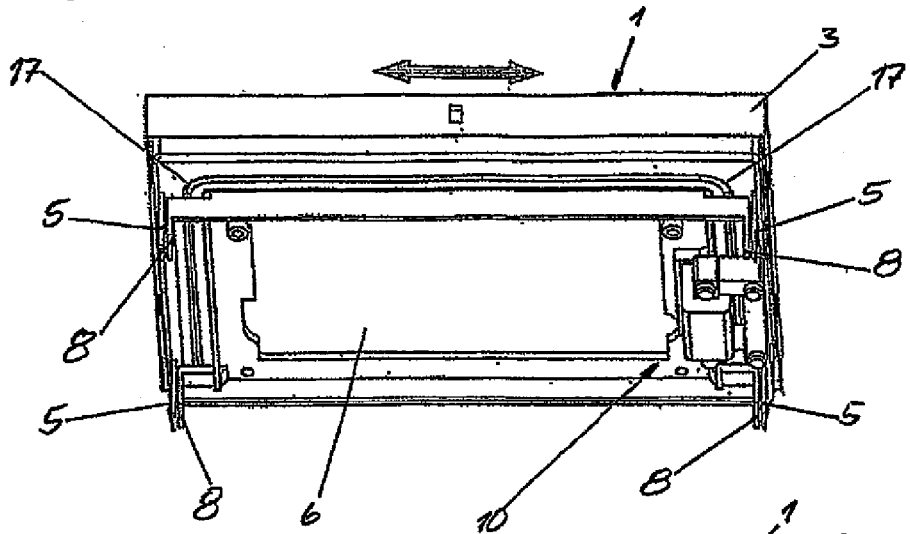
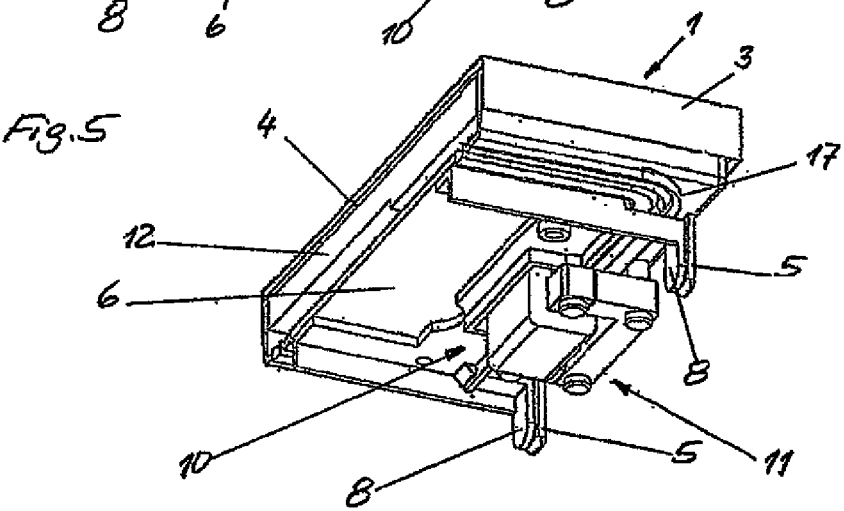
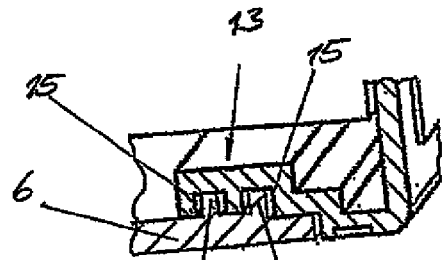
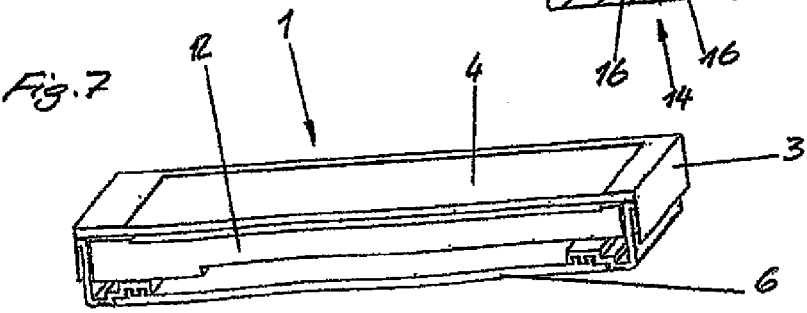

HAPTIC OPERATING DEVICE

PRIORITY CLAIM

This is a U.S. national stage of Application No. PCT/EP2009/064871, filed on Nov. 10, 2009, which claims priority to German Application No: 10 2008 058 568.8, filed: Nov. 21, 2008, the contents of which are incorporated herein by reference.

BACKGROUND OF THE INVENTION

1. Field of the Invention

The invention relates to a haptic operating device, particularly for motor vehicles, comprising a touch panel having at least one touch-sensitive area, a switching signal being able to be triggered when the touch area is touched and the touch panel being able to be activated by a motion drive to move at a certain rhythm in a plane of the touch panel, the touch panel being connected to a fixed support by one or more flexible connecting elements.

2. Related Art

In such haptic operating devices, which serve for triggering a switching signal, when a touch area is actuated movements of the touch panel are triggered at a certain rhythm to provide an operator with information that the switching signal has been correctly triggered.

SUMMARY OF THE INVENTION

It is an object of the invention to provide a haptic operating device of the aforementioned type that has a simple construction which is not susceptible to malfunction and is protected against environmental effects.

According to one embodiment of the invention, the support and the touch panel form two housing parts of a closed housing, in which at least the display device or the display plane thereof is arranged, and which are connected to each other by a sealing device so as to be able to move relative to each other in the plane of the touch panel or in a plane parallel to the touch panel.

As a result, operating errors caused by environmental effects, such as moisture and dust, are avoided.

The housing parts of the touch panel and the support may be adjacent to one another in the plane of the touch panel or in one or more planes parallel to the touch panel, the sealing device being arranged between adjacent regions of the touch panel and the support.

For the relative mobility, in this case the sealing device may be a resilient sealing element connected to the adjacent regions of the touch panel and the support.

For the relative mobility, in this case the sealing device may be a resilient sealing element, such as for example a diaphragm connected to the adjacent regions of the touch panel and the support.

To avoid influencing the motion profile, in particular in the event of wide fluctuations in the ambient temperature, as occur in a motor vehicle, for example, the resilient sealing element preferably consists of a material, the rigidity thereof being at least approximately constant in a temperature range of between −40° C. to +110° C.

To this end, the sealing element may consist of a plastic material.

In a further configuration of the sealing device that at least substantially avoids influencing the motion profile, a labyrinth seal comprising one or more labyrinths and forming a closed annular path may be arranged between the adjacent planes of the touch panel and the support which are parallel to one another, the projections of the labyrinth seal protruding with a greater clearance into the grooves of the labyrinth seal, in a plane parallel to the plane of the touch panel, than the touch panel may be moved by the motion drive relative to the support.

Preferably, in this case the annular path has a rectangular characteristic, the straight lines of the rectangle being connected to one another by radii.

In order to be able to assign the touch areas with the ability to be visually detected, in a simple manner the touch panel may be configured to be transparent at least in the region of the touch areas, one or more display devices fixedly connected to the support being arranged between the touch panel and the support.

An impairment to the visibility of the display area of the display device may be avoided by the housing.

A small constructional volume and an optionally flexible controllability is achieved by the display device being an optoelectrical display device, such as a liquid crystal display (LCD) or an organic light-emitting diode (OLED) or a vacuum fluorescent display (VFD).

Thus, an alphanumeric character and/or symbol which may be associated with the switching function of the associated touch area may preferably be represented by the display device.

Preferably, the motion drive is a motion drive activated in a linear manner in a direction of movement.

The motion drive may be an electromechanical motion drive, such as for example a magnetic motion drive or a piezo-electric motion drive.

This is advantageous, as acceleration of the touch panel of up to 3 G and above which is easily able to be grasped by the human hand, may thus be achieved.

However, any other motion drive, such as for example a pneumatic motion drive, may also be used.

To produce a plurality of touch areas in a small space, the touch panel may have a plurality of touch-sensitive areas distributed over the touch panel and able to be actuated independently of one another, preferably the touch areas being able to be arranged in a matrix to be easily located by the operator.

In a simple embodiment, the touch areas may be piezo-electric and/or capacitive and/or resistive touch areas.

For haptic differentiation, various specific rhythms may be associated with different touch areas, in which the touch panel may be activated so as to be able to move.

Exemplary embodiments of the invention are shown in the drawings and are described in more detail hereinafter.

BRIEF DESCRIPTION OF DRAWINGS

In the drawings:

FIG. 4 is a perspective view from below of a second exemplary embodiment of an operating device;

FIG. 5 is a second perspective partial view from below of the operating device according to FIG. 4;

FIG. 6 is a perspective cross-sectional view of the operating device according to FIG. 4; and FIG. 7 is a perspective view of an enlarged detail of the operating device according to FIG. 4.

DETAILED DESCRIPTION OF DRAWINGS

Figure 1:
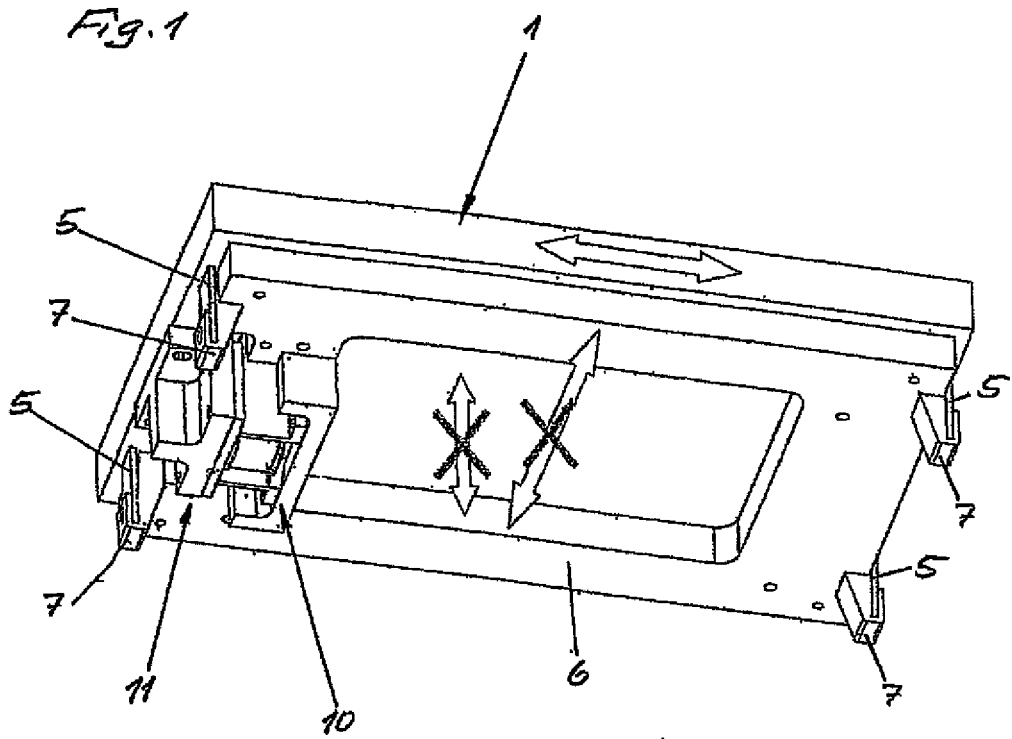
FIG. 1 is a perspective view from below of a first exemplary embodiment of an operating device.

The operating devices shown have a touch panel 1, the upper face thereof being provided with a transparent film 2, which has a plurality of transparent touch-sensitive areas, not-shown.

The touch areas may be capacitive touch areas which, when touched, cause a switching signal to be triggered, which may be forwarded to a device to be actuated.

The touch panel 1 has a rectangular frame 3, the internal region thereof being sealed by a transparent plate 4, to which the film 2 is applied.

Two spring arms 5 with a rectangular cross section are arranged at a distance from one another, in each case with one end thereof, on the short sides of the frame 3, said spring arms protruding at right angles away from the side of the touch panel 1 remote from the film 2.

The spring arms 5 extend with their longitudinal sides parallel to the short sides of the frame 3 and are able to be fastened by their second ends to a support 6.

Figure 2:
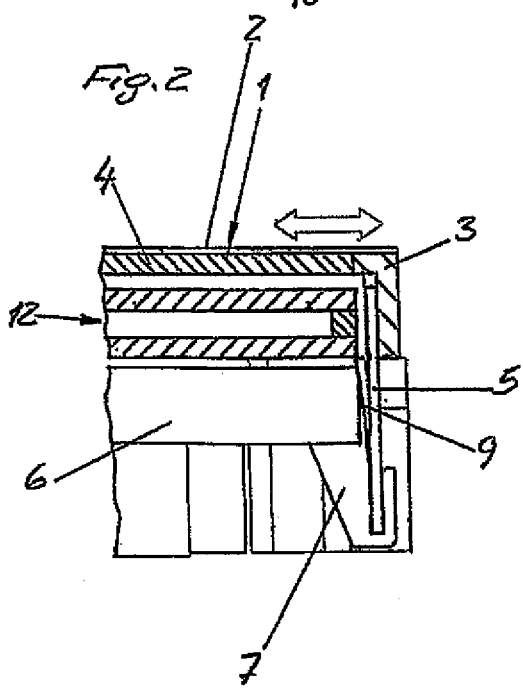
FIG. 2 is a detail of the operating device according to FIG. 1 in cross section.
Figure 3:
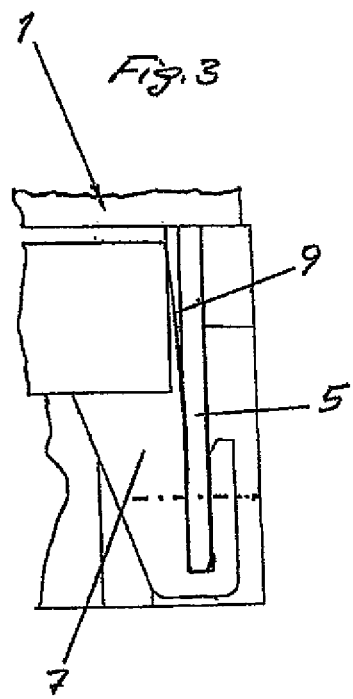
FIG. 3 is an enlarged detail of the operating device according to FIG. 1.

In the exemplary embodiment of FIGS. 1 to 3, the second ends of the spring arms 5 are fixedly clamped in bearing blocks 7 of the support 6.

In the exemplary embodiment of FIGS. 4 to 7, the support 6 has tabs 8, the free ends thereof being connected to the free ends of the spring arms 5.

The bearing blocks 7 and the tabs 8 are arranged on the side of the respective spring arms 5 facing the center of the support 6, and on the side support surfaces 9 thereof facing the spring arms 5 have a bulged portion that extends over part of the distance between the support 6 and the touch panel 1.

Proceeding from the fastening points of the spring arms 5 on the bearing blocks 7 and/or the tabs 8, the support surfaces 9 move toward the central region of the support 6 in the direction of the other end thereof.

As a result, the touch panel 1, borne by the spring arms 5 and connected thereby to the support 6, may be deflected relative to the support 6 in the direction of its longitudinal extension.

Thus the spring arms 5 form a parallelogram, so that deflections other than in the direction of the longitudinal extension of the touch panel 1 are not possible.

A magnetic motion drive 10 is further arranged on the support 6, said magnetic motion drive acting on an armature 11 connected to the touch panel 1 for deflecting the touch panel 1 when a touch area is touched and the switching signal is triggered.

This deflection takes place over a path which alternates from 0.2 mm to 0.5 mm, a separate rhythm being assigned to each touch area, in which when a touch area is touched the touch panel 1 is activated in an oscillating manner by the magnetic motion drive 10.

With each deflection of the touch panel 1, the spring arms 5 on the one short side of the frame 3 increasingly come to bear against bulged portions of the support surfaces 9 assigned thereto, so that at the end of a deflection the spring arms 5 at least substantially bear against the support surfaces 9 associated therewith.

When the magnetic motion drive 10 is switched off, the swinging back takes place, therefore, by means of the spring force of the spring arms 5.

Thus the two other spring arms 5 come to bear against the support surfaces 9 associated therewith.

This oscillating rhythm is able to be detected and identified haptically by the operator touching the touch area.

Information that the switching signal has been triggered and information about which touch area has been actuated, by identifying the specific rhythm, is provided haptically.

Thus the operator is able to establish whether the touch area to be actuated has actually been touched.

In order initially to be able to identify visually the position of the respective touch area to be actuated on the touch panel 1, on the side of the touch panel 1 remote from the film 2, a liquid crystal display 12 is arranged on the support 6, the characters and/or symbols of said liquid crystal display, which are shown, being able to be seen by the operator through the transparent plate 4 of the touch panel 1.

Thus behind every touch area a character and/or symbol assigned thereto is arranged.

In the exemplary embodiment of FIGS. 4 to 7, the support and touch panel 1 form two housing parts of a closed housing.

The touch panel 1 is thus configured as a box which is open on the side opposing the plate 4, and which at its opening region has a peripheral sealing region 13 parallel to the plate 4.

A planar sealing region 14 of the support 6 configured in a plate-like manner bears against this sealing region 13, in a plane parallel thereto.

Two continuous peripheral grooves 15 are formed on the sealing region 13 of the touch panel 1, extending parallel to one another along the opening region and forming an annular path, and into which corresponding continuous peripheral projections 16 of the sealing region 14 of the support 6 protrude.

The annular paths consisting of the grooves 15 and projections 16, which form a labyrinth seal, have a rectangular characteristic, the straight lines of the rectangle being connected to one another by means of radii 17.

In order to permit the unhindered deflection movement of the touch panel 1 relative to the support 6, the grooves 15 have such a width that the projections 16 do not come to bear against the groove walls when the touch panel 1 is deflected.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A haptic operating device, particularly for motor vehicles, comprising
    a display device;
    a motion drive configured to move at a certain rhythm in a plane of the touch panel;
    a touch panel having at least one touch-sensitive area, the touch-sensitive area configured to trigger a switching signal when the touch area is touched; and a fixed support to which the touch panel is connected by one or more flexible connecting elements and having peripheral projections, wherein the support and the touch panel form two housing parts of a closed housing in which at least one of the display device and a display plane thereof is arranged and which are connected to each other by a sealing device to be able to move relative to each other in one of the plane of the touch panel and a plane parallel to the touch panel, wherein the sealing device comprises two continuous peripheral grooves formed on a sealing region of the touch panel that extend parallel to one another and form an annular path into which the peripheral projections of the support protrude.

2. The display unit as claimed in claim 1, wherein the two housing parts and the support are one of adjacent to one another in the plane of the touch panel and in one or more planes parallel to the touch panel, the sealing device being arranged between adjacent regions of the touch panel and the support.

3. The display unit as claimed in claim 2, wherein the sealing device is a resilient sealing element connected to the adjacent regions of the touch panel and the support.

4. The display unit as claimed in claim 3, wherein the resilient sealing element is a diaphragm.

5. The display unit as claimed in claim 4, wherein the resilient sealing element comprises a material having a rigidity at least approximately constant in a temperature range of between −40° C. to +110° C.

6. The display unit as claimed in claim 5, wherein the sealing element comprises a plastics material.

7. The display unit as claimed in claim 2, further comprising a labyrinth seal having one or more labyrinths forming a closed annular path is arranged between the adjacent planes of the touch panel and the support which are parallel to one another, the projections of the labyrinth seal protruding with a greater clearance into the grooves of the labyrinth seal, in a plane parallel to the plane of the touch panel, than the touch panel may be moved by the motion drive relative to the support.

8. The display unit as claimed in claim 7, wherein the annular path has a rectangular characteristic, the straight lines of the rectangle being connected together by radii.

9. The display unit as claimed in claim 1, wherein the touch panel is configured to be transparent at least in the region of the touch areas and one or more display devices fixedly connected to the support being arranged between the touch panel and support.

10. The display unit as claimed in claim 9, wherein the display device is an optoelectrical display device.

11. The display unit as claimed in claim 10, wherein the optoelectrical display device is one of a liquid crystal display (LCD]), an organic light-emitting diode (OLED), and a vacuum fluorescent display (VFD).

12. The display unit as claimed in claim 9, wherein at least one of an alphanumerical character and symbol associated with the switching function of the associated touch area is represented by the display device.

13. The display unit as claimed in claim 1, wherein the motion drive is a motion drive that is activated in a linear manner in a direction of movement.

14. The display unit as claimed in claim 13, wherein the motion drive is one of an electromechanical motion drive and a pneumatic motion drive.

15. The display unit as claimed in claim 14, wherein the electromechanical motion drive is one of a magnetic motion drive and a piezo-electric motion drive.

16. The display unit as claimed in claim 1, wherein the touch panel has a plurality of touch-sensitive areas distributed over the touch panel, each touch-sensitive area configured to be actuated independently.

17. The display unit as claimed in claim 3, wherein the resilient sealing element comprises a material having a rigidity at least approximately constant in a temperature range of between −40° C. to +110° C.

18. The display unit as claimed in claim 16, wherein the plural touch areas are arranged in a matrix.

19. The display unit as claimed in one claim 16, wherein the plural touch areas are at least one of piezoelectric, capacitive, and resistive touch areas.

20. The display unit as claimed in claim 16, wherein a rhythm is associated with each touch area in which the touch panel may be activated so as to be able to move.

* * * * *